(12) United States Patent
Porcheret et al.

(10) Patent No.: US 11,453,196 B2
(45) Date of Patent: Sep. 27, 2022

(54) REINFORCER, COMPOSITE MATERIAL COMPRISING SUCH A REINFORCER, METHOD OF USING SUCH A REINFORCER

(71) Applicant: PORCHER INDUSTRIES, Badinieres (FR)

(72) Inventors: Jacques Porcheret, Veyssilieu (FR); Freddy Macrez, Lagnieu (FR); Patrick Ramel, Charnoz (FR)

(73) Assignee: PORCHER INDUSTRIES, Badinieres (FR)

(*) Notice: Subject to any disclaimer, the term of this patent is extended or adjusted under 35 U.S.C. 154(b) by 0 days.

(21) Appl. No.: 16/335,927

(22) PCT Filed: Sep. 22, 2017

(86) PCT No.: PCT/EP2017/074106
§ 371 (c)(1),
(2) Date: Mar. 22, 2019

(87) PCT Pub. No.: WO2018/055118
PCT Pub. Date: Mar. 29, 2018

(65) Prior Publication Data
US 2019/0308387 A1 Oct. 10, 2019

(30) Foreign Application Priority Data
Sep. 23, 2016 (FR) ...................................... 1658975

(51) Int. Cl.
*B32B 5/02* (2006.01)
*B32B 3/26* (2006.01)
(Continued)

(52) U.S. Cl.
CPC .............. *B32B 5/022* (2013.01); *B29C 61/02* (2013.01); *B29C 70/10* (2013.01); *B29C 70/26* (2013.01);
(Continued)

(58) Field of Classification Search
CPC ............ B32B 2250/02; B32B 2250/03; B32B 2250/40; B32B 2260/023;
(Continued)

(56) References Cited

U.S. PATENT DOCUMENTS 4,902,326 A * 2/1990 Jarmon ................. C03C 14/002
264/109
90,970,047 8/2015 Geer
(Continued)

OTHER PUBLICATIONS

Specialty Materials (Gen 1 Hy-Bor Prepreg Tape, https://www.specmaterials.com/hy-bor) accessed Mar. 2021.*
(Continued)

*Primary Examiner* — Alicia J Sawdon
(74) *Attorney, Agent, or Firm* — Nixon & Vanderhye

(57) ABSTRACT

A disclosed reinforcer includes a shrinkable layer able to shrink in a direction of shrinkage, under the effect of a heat-shrink heat treatment, from an initial state to a shrunk state, a first corrugatable layer, which includes a gridwork of filaments added against the shrinkable layer and connected to the shrinkable layer by connection lines spaced apart and extending transversely with respect to the direction of shrinkage, the first corrugatable layer exhibiting a shrinkage that is substantially zero or that is smaller than that of the shrinkable layer, so that, when the shrinkable layer is in the initial state, portions of the first corrugatable layer, each defined between two consecutive connection lines, are bent over and, when the shrinkable layer is in the shrunk state, the portions of the first corrugatable layer are curved.

22 Claims, 5 Drawing Sheets

(51) Int. Cl.
- *B32B 37/18* (2006.01)
- *B32B 5/04* (2006.01)
- *B29C 70/26* (2006.01)
- *B32B 5/24* (2006.01)
- *B32B 7/05* (2019.01)
- *B29C 61/02* (2006.01)
- *B32B 3/28* (2006.01)
- *B29C 70/10* (2006.01)

(52) U.S. Cl.
CPC ............... *B32B 3/263* (2013.01); *B32B 3/28* (2013.01); *B32B 5/024* (2013.01); *B32B 5/028* (2013.01); *B32B 5/04* (2013.01); *B32B 5/24* (2013.01); *B32B 7/05* (2019.01); *B32B 37/18* (2013.01); *B32B 2250/02* (2013.01); *B32B 2250/03* (2013.01); *B32B 2250/40* (2013.01); *B32B 2260/023* (2013.01); *B32B 2260/046* (2013.01); *B32B 2262/02* (2013.01); *B32B 2262/0253* (2013.01); *B32B 2262/0261* (2013.01); *B32B 2262/0276* (2013.01); *B32B 2262/0292* (2013.01); *B32B 2262/04* (2013.01); *B32B 2262/08* (2013.01); *B32B 2262/10* (2013.01); *B32B 2262/101* (2013.01); *B32B 2262/103* (2013.01); *B32B 2262/105* (2013.01); *B32B 2262/106* (2013.01); *B32B 2307/102* (2013.01); *B32B 2307/304* (2013.01); *B32B 2307/3065* (2013.01); *B32B 2307/51* (2013.01); *B32B 2307/54* (2013.01); *B32B 2307/546* (2013.01); *B32B 2307/558* (2013.01); *B32B 2307/736* (2013.01); *B32B 2419/00* (2013.01); *B32B 2459/00* (2013.01); *B32B 2471/00* (2013.01); *B32B 2479/00* (2013.01); *B32B 2603/00* (2013.01); *B32B 2605/08* (2013.01); *B32B 2605/18* (2013.01); *B32B 2607/00* (2013.01)

(58) Field of Classification Search
CPC .......... B32B 2260/046; B32B 2262/02; B32B 2262/0253; B32B 2262/0261; B32B 2262/0276; B32B 2262/0292; B32B 2262/04; B32B 2262/08; B32B 2262/10; B32B 2262/101; B32B 2262/103; B32B 2262/105; B32B 2262/106; B32B 2307/102; B32B 2307/304; B32B 2307/3065; B32B 2307/51; B32B 2307/54; B32B 2307/546; B32B 2307/558; B32B 2307/736; B32B 2419/00; B32B 2459/00; B32B 2471/00; B32B 2479/00; B32B 2603/00; B32B 2605/08; B32B 2605/18; B32B 2607/00; B32B 3/263; B32B 3/28; B32B 37/18; B32B 5/022; B32B 5/024; B32B 5/028; B32B 5/04; B32B 5/24; B32B 7/05
See application file for complete search history.

(56) References Cited

U.S. PATENT DOCUMENTS

| | | | |
|---|---|---|---|
| 2009/0202776 A1 | 8/2009 | Brandon et al. | |
| 2009/0258191 A1* | 10/2009 | Peacock | B29C 61/02 428/167 |
| 2016/0177483 A1* | 6/2016 | Pesquet | D04H 13/001 442/1 |

OTHER PUBLICATIONS

International Search Report, dated Oct. 30, 2017, from corresponding PCT/EP2017/074106 application.

* cited by examiner

REINFORCER, COMPOSITE MATERIAL COMPRISING SUCH A REINFORCER, METHOD OF USING SUCH A REINFORCER

The present invention relates to a reinforcer, a composite material comprising such a reinforcer, and a method of using such a reinforcer.

The invention relates to the general field of composite materials including a reinforcer with a ventilated structure, i.e., comprising free spaces, or materials formed by such a reinforcer with a ventilated structure.

The invention aims to propose a new reinforcer with multiple uses, in particular for producing composite materials, this reinforcer being inexpensive, while being easy to use and transport.

The invention relates to a reinforcer comprising:
- a shrinkable layer able to shrink in a direction of shrinkage, under the effect of a heat-shrink heat treatment, from an initial state to a shrunk state,
- a first corrugatable layer, which comprises a grid work of yarns added against the shrinkable layer, the grid work of yarns of the first corrugatable layer being connected to the shrinkable layer by connection lines spaced apart and extending transversely with respect to the direction of shrinkage, the first corrugatable layer exhibiting a shrinkage that is substantially zero or that is smaller than that of the shrinkable layer along the direction of shrinkage under the effect of the heat-shrink heat treatment, so that:
  - when the shrinkable layer is in the initial state, portions of the first corrugatable layer, each defined between two consecutive connection lines, are folded down against the shrinkable layer, and
  - when the shrinkable layer is in the shrunk state, the portions of the first corrugatable layer are curved.

Owing to the invention, the reinforcer is designed to go from a state in which it takes up little space, when the shrinkable layer is in the initial state, to a shrunk state in which it takes up more room while delimiting free spaces. Indeed, the curved nature of the portions makes it possible to arrange free spaces delimited by the corrugatable layer, the shrinkable layer, and the connection lines, for each portion. As a result, this reinforcer has multiple applications, while being used as is or to produce a composite material. To form a composite material, it is advantageously possible to submerge, fill or cover the reinforcer with a matrix, while the shrinkable layer is in the shrunk state. Indeed, when the shrinkable layer is in the shrunk state, the portions of the first corrugatable layer are forced to assume a curved shape delimiting a certain free volume, which may advantageously be reinforced by adding a matrix. The shrinkable layer being in the shrunk state, conduits are advantageously defined between the curved portions and the shrinkable layer, these conduits in particular making it possible to introduce the matrix within them to form the composite material, by connecting this matrix to the reinforcer.

The passage from the initial state to the shrunk state can be obtained easily using a heat-shrink heat treatment, which may be done on the location where it is planned to form the composite material. The transport of the reinforcer to this location is thus made easier, since it can be done while the shrinkable layer is in the initial state, in which the portions of the corrugatable layer are folded down and take up less room. Alternatively, the heat-shrink heat treatment step can be done during the manufacture of the reinforcer, so that the reinforcer is ready to use. The reinforcer is therefore particularly easy to use and transport.

According to other optional and advantageous features of the invention, considered alone or in combination:
- the shrinkable layer comprises shrinkable yarns extending in the direction of shrinkage, the shrinkable yarns preferably being made from shrinkable polymer, synthetic or natural, for example polyester, polyether, polyethylene, polypropylene, polyamide, wool.
- the shrinkable polymer is chosen so that the heat-shrink heat treatment comprises heating to a shrinkage temperature of between 100 and 200° C., preferably 180° C.
- the shrinkable layer comprises transverse yarns that exhibit a shrinkage that is substantially zero or that is smaller than that of the shrinkable yarns under the effect of the heat-shrink heat treatment, and that are arranged transversely relative to the direction of shrinkage, while being connected to the shrinkable yarns in order to form a gridwork with the shrinkable yarns.
- the gridwork of the first corrugatable layer comprises inorganic yarns, which preferably comprise glass, carbon, ceramic or metal.
- the first corrugatable layer comprises a layer of nonwoven material, the gridwork of the first corrugatable layer being submerged in, or connected to, the layer of nonwoven material.
- the layer of nonwoven material is made from polymer, for example a polyester, a polyester-cellulose hybrid, a polypropylene, polyethylene, polyamide or polyurethane.
- the first corrugatable layer is connected to the shrinkable layer by carrying out a bonding treatment, for example of the heat or chemical type, only at each connection line.
- the reinforcer comprises a second corrugatable layer, which comprises a gridwork of yarns attached against the second shrinkable layer, such that the first corrugatable layer and the second corrugatable layer are attached on either side of the shrinkable layer, the gridwork of the second corrugatable layer being connected to the shrinkable layer by connection lines, which are advantageously superimposed on or combined with the connection lines of the first corrugatable layer, the second corrugatable layer exhibiting a shrinkage that is substantially zero or that is smaller than that of the shrinkable layer, along the direction of shrinkage, under the effect of the heat-shrink heat treatment, so that:
  - when the shrinkable layer is in the initial state, portions of the second corrugatable layer, each defined between two consecutive connection lines, are folded down against the shrinkable layer, and
  - when the shrinkable layer is in the shrunk state, the portions of the second corrugatable layer are curved.

The invention also relates to a composite material comprising a reinforcer, according to the preceding, the shrinkable layer of which is in the shrunk state, and comprising:
- a matrix, the reinforcer being filled by, covered by, or submerged in the matrix, and/or
- a layer of skin attached against the first corrugatable layer and connected to the corrugatable layer via at least two curved portions.

The invention also relates to a method of using a reinforcer according to the preceding. The method comprises a first step a) during which, the shrinkable layer being in the initial state, a heat-shrink heat treatment is carried out to place the shrinkable layer in the shrunk state, as well as at least one of the following steps b) and c), carried out successively with respect to the first step a):
b) the reinforcer is submerged in, filled with or covered by a matrix,
c) a layer of skin is connected against the first corrugatable layer, for example by lamination, by means of at least two curved portions.

The invention will be better understood upon reading the following description, given solely as a non-limiting example and done in reference to the drawings, in which.

Figure 2:
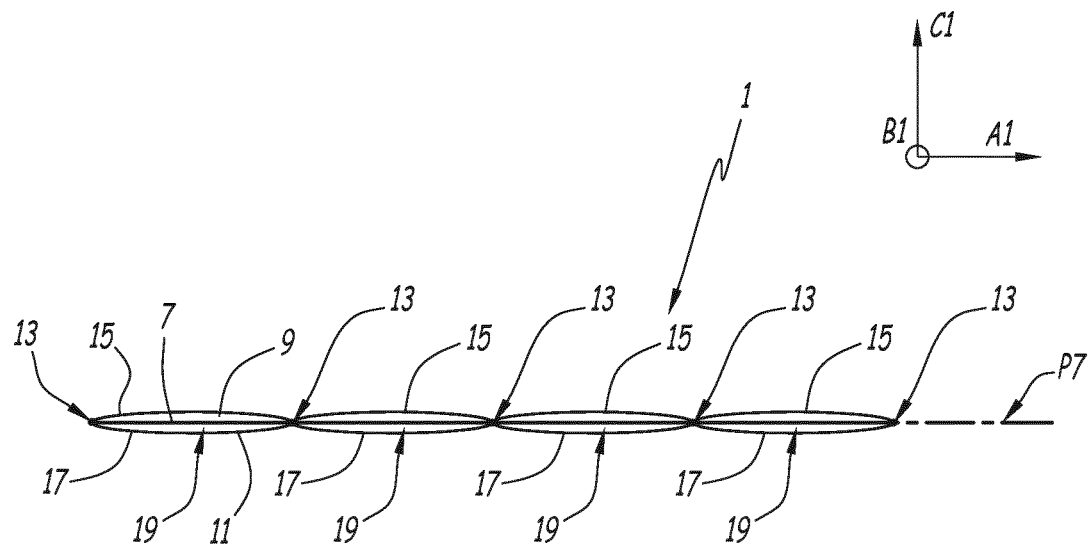
FIGS. 2 and 3 are side views of the reinforcer of FIG. 1, according to two different configurations.
Figure 3:
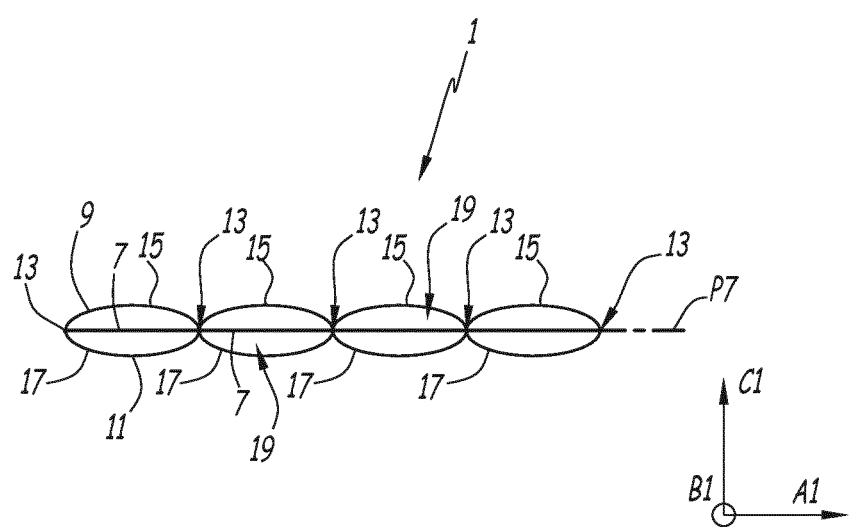
Figure 5:
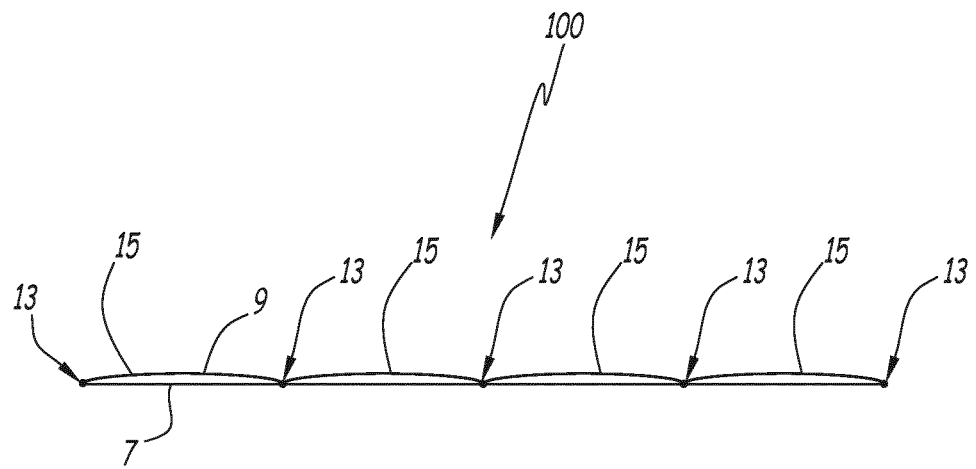
Figure 6:
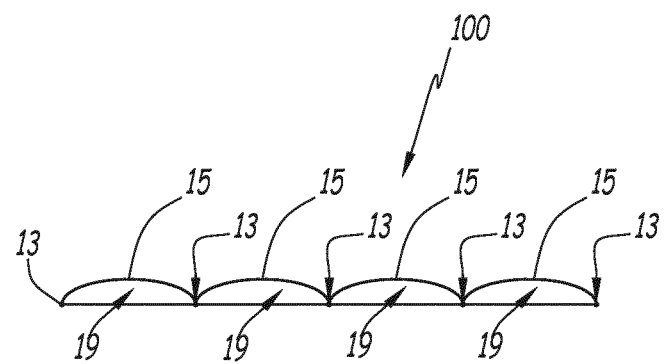
Figure 7:
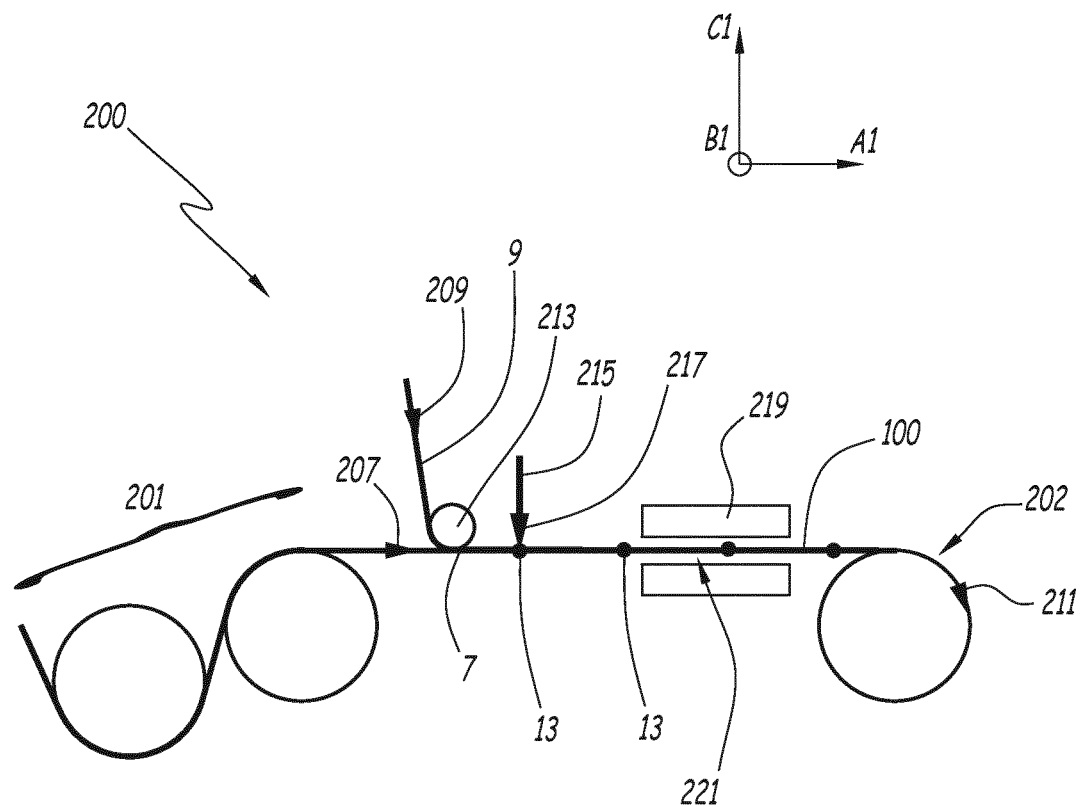

FIGS. 5 and 6 are side views similar to those of FIGS. 2 and 3, of a reinforcer according to a second embodiment of the invention, the reinforcer being shown in two different configurations, and FIG. 7 is a schematic view of a machine for manufacturing the reinforcer of FIGS. 5 and 6.

The reinforcer 1 of the first embodiment, illustrated in FIGS. 1 to 4, can be used alone, or be appropriate for manufacturing many types of composite materials. In particular, the reinforcer can be covered (i.e., coated) with, filled with or submerged in a matrix 3, for consolidation or filling, illustrated in FIG. 4. The reinforcer 1 and its matrix 3 together form a composite material.

Figure 4:
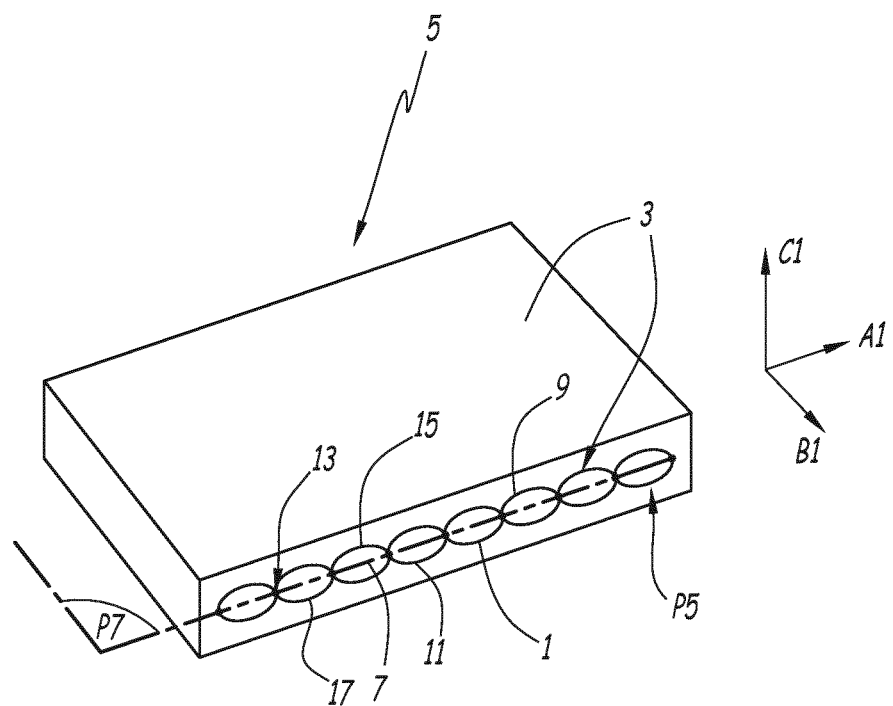
FIG. 4 is a perspective view of a part made from composite material, cut along a plane P5, comprising a reinforcer according to the invention.

In FIG. 4, the composite material forms a parallelepiped part 5. The reinforcer 1 is visible at the cutting plane P5.

In this composite material, the reinforcer 1 is consolidated by being submerged in the consolidating matrix 3, which is in a solid or hardened state. In this case, the matrix 3 is on the outside and in the spaces inside the reinforcer 1. In an alternative that is not shown, the matrix present on the outside of the reinforcer can be in a thin layer (film) marrying the corrugated outer shape.

Depending on the field of application, the consolidating matrix 3 may comprise one or more of the following materials:
a thermosetting polymer chosen from among the following polymers:
epoxides: polyepoxide (EP),
phenolics: phenol-formaldehyde (phenoplast, PF),
a thermoplastic polymer chosen from among the following polymers:
polyacetals: polyoxymethylene (POM),
acrylics: polymethyl methacrylate (PMMA, Plexiglas), polyacrylonitrile (PAN), methyl 2-cyanoacrylate (cyanoacrylate, MCA),
cellulosics: cellulose triacetate (CA),
polyamides: polyamide 6 (PA 6), polyamide 6-6 (PA 6-6, Nylon), polyamide 11 (PA 11), aromatic polyamides, or aramids: poly-meta-phenylene isophthalamide (MDP-I, meta-aramid, Nomex), poly-para-phenylene terephthalamide (PPP-T, para-aramid, Kevlar),
polycarbonate (PC);
polyaryl ketones: polyether ketoneketone PEKK, polyetheretherketone (PEEK),
polyesters: polyethylene terephthalate (PET), unsaturated polyester (UP), polybutylene terephthalate (PBT),
polyolefins: polyethylene (PE), low-density polyethylene (LDPE), low linear density polyethylene (LLDPE), high-density polyethylene (HDPE), ultra-high molecular weight polyethylene (UHMWPE), polypropylene (PP), fluorinated polyolefins: polytetrafluoroethylene (PTFE, Teflon),
styrenics: polystyrene (PS), polystyrene butene (SB, high-impact polystyrene), styrene acrylonitrile (SAN), acrylonitrile butadiene styrene (ABS),
vinylics: polyvinyl chloride (PVC), polyvinylidene chloride (PVDC);
polyimides (PI);
an elastomer, chosen from among the following elastomers:
elastomers: butadiene-acrylonitrile (NBR, rubber nitrile);
fluorinated elastomers, fluoroelastomers: FPM (fluorinated propylene monomer),
ethylene vinyl acetate (EVA),
polychloroprene (CR),
polyisoprene (IR, synthetic rubber),
silicones or siloxanes: polydimethylsiloxane (PDMS), polydiphenylsiloxane (PDPS);
a copolymer based on some of the preceding polymers, or a mixture of polymers or copolymers,
a foam,
an inorganic material, such as concrete, cement or the like.

The reinforcer 1 preferably has no metal, such that its corrosion resistance is high, unlike a metal reinforcer.

In an alternative that is not shown, instead of being submerged in the matrix 3, the reinforcer 1 is only covered, i.e., coated, with a layer of matrix 3 in order to be hardened, without necessarily being filled with matrix 3. The matrix 3 then forms either a thin film on the surface of the reinforcer 1, or a thicker flat layer like in 4.

Alternatively, the matrix 3 can be chosen simply to fill the reinforcer 1, without an outer layer. In one embodiment, this matrix 3 fills the reinforcer 1 without significantly hardening or consolidating the latter. In this case, the reinforcer 1 serves as a support structure or casing for the filling matrix 3 and may or may not be bonded to the latter. The filling matrix 3 may in particular be formed by a foam, for example polymer, with thermally and/or acoustically insulating properties, preferably fire resistant. Examples of foam include Polyetherimide (PEI) foams. Alternatively, the filling matrix 3 comprises a powdered material, such as sand or gravel. In the case where the reinforcer 1 is submerged, it is both covered and filled with the matrix 3.

Figure 1:
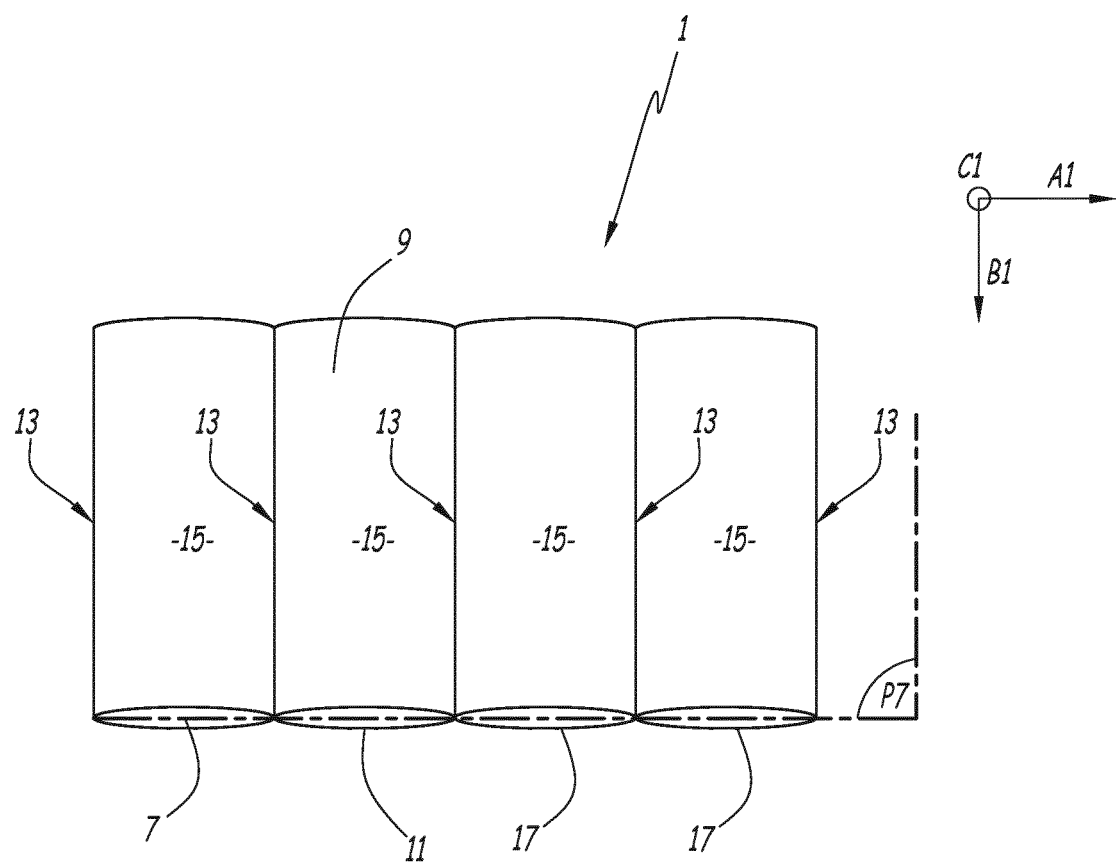
FIG. 1 is a perspective view of a pump according to a first embodiment of the invention.

As illustrated in FIGS. 1 to 3, the reinforcer 1 comprises a shrinkable layer 7, which defines a main plane P7 of the reinforcer 1, as well as two corrugatable layers 9 and 11 attached and fastened on the shrinkable layer 7, on either side of the latter. In other words, the corrugatable layers 9 and 11 are each attached on one of the two opposite faces of the shrinkable layer 7.

Preferentially, the shrinkable layer 7 comprises shrinkable yarns that extend along a direction of shrinkage A1, the direction of shrinkage A1 being oriented along the main plane P7. Owing to these shrinkable yarns, the shrinkable layer 7 evolves, under the effect of an appropriate heat treatment, called "heat-shrink heat treatment", from an initial state illustrated in FIGS. 1 and 2, to a shrunk state illustrated in FIG. 3, along the direction of shrinkage A1. In practice, the shrinkable yarns are substantially parallel to the direction A1 and are spaced apart from one another substantially regularly along a transverse direction B1, the direction B1 being parallel to the plane P7 and perpendicular to the direction A1. The shrinkable yarns preferably extend over the entire length of the layer 7, or at least over the majority of the length of said layer 7.

Preferably, the passage from the initial state to the shrinkable state of the shrinkable yarns is irreversible.

To obtain the "shrinkable" nature of the shrinkable yarns, each shrinkable yarn is preferably made from a shrinkable material, or treated to be shrinkable. This shrinkable material is preferably a synthetic material. This shrinkable material can be a shrinkable polymer, synthetic or natural, for example polyester, polyether, polyethylene, polypropylene, polyamide or wool.

In the initial state, the shrinkable yarns have a length that adopts an initial value along the direction A1. In the shrunk state, the length of the shrinkable yarns adopts a smaller value relative to the initial value, such that the length along the direction A1 of the shrinkable layer becomes smaller between the initial state and the shrunk state. Preferably, the reduction rate of the length of the shrinkable yarns, or shrinkage rate, is between 2 and 60%, preferably 4 to 20%. The shrinkable material of the shrinkable layer 7 is chosen so that the heat-shrink heat treatment comprises, or consists of, heating to a shrinkage temperature, for example of between 120 and 200° C. (degrees Celsius), preferentially 180° C. In order to obtain the aforementioned characteristics, it is for example possible to use a polyester shrinkable yarn of type HT101, manufactured by Hailide®.

The shrinkable layer 7 also comprises transverse yarns, which have a shrinkage, or shrinkage rate, that is substantially zero or that is smaller than that of the shrinkable yarns along the direction A1. The transverse yarns are arranged transversely, in particular along the direction B1, relative to the direction of shrinkage A1. The transverse yarns are regularly spaced apart from one another in the direction A1. The transverse yarns are connected to the shrinkable yarns, for example by gluing or welding, in order to form a gridwork with the shrinkable yarns.

Alternatively, it is possible to provide that the transverse yarns are made from the same material as the longitudinal yarns, but that the transverse yarns are shrunk prior to manufacturing the shrinkable layer, while the longitudinal yarns are in the non-shrunk state. Using two identical materials indeed makes it easier to manufacture the shrinkable layer.

Alternatively, using shrinkable longitudinal and transverse yarns that have a different shrinkage temperature makes it possible to shrink the longitudinal or transverse yarns selectively by applying an appropriate temperature.

In general, the term "gridwork" used in the present description refers to an assembly of yarns that extend along a first direction with yarns that extend along a second direction, without weaving said yarns, the yarns of the first direction being connected to the yarns of the second direction, for example by gluing or welding the yarns together. The gridwork has a "pitch", which reflects the separation of the consecutive yarns in the same direction.

Owing to the presence of said transverse yarns, the shrinkable layer 7 is advantageously only shrinkable in the direction A1. The transverse yarns are preferably made from a material different from that of the shrinkable yarns, preferably glass or another inorganic material. For example, these are continuous glass yarns, for instance with a titer of 11 to 400 tex. Materials other than those cited may be implemented for the transverse yarns.

The gridwork of the shrinkable layer 7, in the initial state, preferably has a pitch of between about 0.3 and 8 yarns/cm, with the understanding that other pitch values can be considered based on the application. Preferably, the pitch of the gridwork of the shrinkable layer 7 is large enough to allow the matrix 3 to penetrate between the yarns of the gridwork, when said matrix is in a liquid, softened, or non-hardened state, such that each yarn of said gridwork, or at least the majority of the yarns, is submerged in or covered by the matrix 3.

The gridwork of the shrinkable layer 7, in the initial or shrunk state, is preferentially flexible like a traditional gridwork or a fabric, for example so as to be able to be wound on a roll. Thus, the plane P7 and the various directions A1 and B1 shown in the figures follow any curvature of the shrinkable layer 7 and the reinforcer 1.

As an alternative to a gridwork of yarns, the shrinkable layer 7 comprises a fabric, the yarns of which in a given direction are shrinkable.

As an alternative to a gridwork of yarns, the shrinkable layer 7 comprises a layer of solid or nonwoven material, shrinkable at least along the direction A1.

Furthermore, each corrugatable layer 9 and 11 comprises a gridwork of yarns, which is attached and fastened permanently against the shrinkable layer 7, in particular against the gridwork of the latter. The yarns of the respective gridworks of the corrugatable layers 9 and 11 extend in the alignment of the shrinkable yarns and the transverse yarns of the gridwork of the layer 7. The respective gridwork of each corrugatable layer 9 and 11 comprises yarns that have a shrinkage that is substantially zero or that is smaller than that of the shrinkable layer 7 under the effect of the heat-shrink heat treatment, in particular along the direction A1.

To that end, the gridwork of each corrugatable layer 9 and 11 is preferably made from inorganic yarns, for example comprising glass or carbon, or other materials with low shrinkage under the effect of the heat-shrink heat treatment. The use of these other materials depends on the application. It is for example possible to use glass yarns, carbon yarns, ceramic yarns, or metal yarns.

Alternatively, the gridwork of each corrugatable layer 9 and 11 is made from organic yarns, such as cotton, linen or wool.

Preferably, the pitch of the respective gridworks of the corrugatable layers 9 and 11 exhibits the same value as that of the pitch of the gridwork of the shrinkable layer 7, if the latter comprises a gridwork. Alternatively, the pitch value of the gridworks of the different layers 7, 9 and 11 is different.

Like the gridwork of the layer 7, the gridworks of the layers 9 and 11 are flexible, for example like a traditional gridwork or a fabric, so as to be able to be wound on a roll.

Furthermore, each corrugatable layer 9 and 11 may comprise a layer of nonwoven material, in which the gridwork of the layer 9 or 11 in question is submerged. If it is not submerged, each layer of nonwoven material is at least connected to its respective gridwork, for example by gluing or welding. Each layer of nonwoven material preferentially extends over the entire length, or at least over the majority of the length, of the layer 9 or 11 in question. Preferably, these nonwoven layers are each formed by a film imparting the aforementioned flexible nature to the layers 9 or 11, respectively. Each nonwoven layer preferentially has a small enough pore size for the reinforcer 1 to be able to be filled by the matrix 3 without the latter leaking through said nonwoven layer, potentially aside from solvents or gases that said matrix 3 may contain.

Preferably, the layer of nonwoven material is made from a synthetic material, in particular polymer, for example a polyester, a polyester-cellulose hybrid, a polypropylene, polyethylene, polyamide or polyurethane.

As an alternative to a nonwoven material, it is possible to provide a layer of woven material, depending on the application.

Alternatively to or jointly with the presence of layers of nonwoven or woven material, each corrugatable layer 9 and 11 may comprise a layer of connecting material, which extends on the surface of the corrugatable layer 9 and 11 in question, while being arranged across from the shrinkable layer 7. The connecting material is chosen to have a bonding or adhesive power, when it is subjected to a bonding treatment, for example of the heat or chemical type. This connecting material is for example a thermofusible glue, the activation of which is done using a heat-shrink heat treatment.

Each corrugatable layer 9 and 11 is connected to the shrinkable layer 7 by locally performing the bonding treatment, on the layer of connecting material, at several connection lines 13 that are spaced apart and extend along the direction B1, as illustrated in FIGS. 1 to 3. Thus, when the layer of connecting material extends continuously along the direction A1, this layer of connecting material is treated locally, only at the connection lines 13, such that the corrugatable layers 9 and 11 are only connected to the shrinkable layer 7 at said connection lines 13. In the case of a heat bonding treatment, the heat bonding treatment is only applied locally, at the connection lines, and does not cause the shrinkage of the shrinkable layer 7.

It is also possible to perform other types of bonding treatments, in particular bonding by ultrasonic welding.

As an alternative to a bonding treatment, the corrugatable layers 9 and/or 11 can be connected with the shrinkable layer 7, at the connection lines 13, using a mechanical connection, for example sewing or stapling.

The connection lines 13 are shown in FIGS. 1 to 3 as being linear along the direction B1, i.e., periodic along the direction A1. However, in practice, the connection lines 13 have a certain nonzero width along the direction A1, in order to guarantee the mechanical strength of the connection between the corrugatable layers 9 and 11 and the shrinkable layer 7.

Furthermore, as illustrated in FIGS. 1 to 4, the arrangement of the corrugatable layers 9 and 11 is therefore symmetrical relative to the plane P7, each layer 9 and 11 being connected to the layer 7 at the shared connection lines 13.

As an alternative to a layer of connecting material arranged continuously within corrugatable layers 9 and 11, it is possible to provide local welding or gluing, at connection lines 13, of each corrugatable layer 9 and 11 on the shrinkable layer 7.

Alternatively, it is possible to provide that the corrugatable layers 9 and 11 have no layer of connecting material, and that the gridwork of each corrugatable layer 9 and 11 is in turn at least partially made from a material that exhibits a bonding nature after carrying out the bonding treatment.

Alternatively, it is possible to provide that the corrugatable layers 9 and 11 have no layer of connecting material, and that the yarns of the shrinkable layer 7 are in turn at least partially made from a material that has a bonding nature after carrying out the bonding treatment.

Also alternatively, all or some of the yarns of at least one of the layers 7, 9 and 11 may be coated with an adhesive material that has a bonding nature after carrying out the bonding treatment.

Alternatively, it is provided that the layer 7 is connected to the layer 11 by separate connection lines superimposed with other connection lines by means of which the layer 9 is connected to the layer 11. Also alternatively, it is provided that the connection lines connecting the layer 7 with the layer 11 are not superimposed with the connection lines connecting the layer 9 with the layer 11. For example, along the direction A1, a connection line connecting the layers 7 and 11 is alternated with a connection line connecting the layers 9 and 11, such that the portions 15 are offset or in staggered rows relative to the portions 17.

In general, the connection lines can be spaced apart irregularly along the direction A1, or the pitch of the connection lines of the layer 9 can be different from that of the connection lines of the layer 11.

In any case, the corrugatable layers 9 and 11 are connected to the shrinkable layer 7 in several separate locations along the direction A1, and continuously along the direction B1, over the entire surface of the shrinkable layer 7 along these two directions A1 and B1. The corrugatable layers 9 and 11 are not connected to the shrinkable layer 7 between two consecutive connection lines 13.

The portions 15 of the first corrugatable layer 9 are defined, which are each delimited by two consecutive connection lines 13. Likewise, the portions 17 of the second corrugatable layer 11 are defined, which are each delimited by two consecutive connection lines 13. In FIGS. 1 to 3, each corrugatable layer 9 and 11 respectively comprises four portions 15 and 16 as well as five connection lines 13. However, it is understood that more or fewer portions and connection lines can be provided along the direction A1, depending on the application. For example, in FIG. 4, the reinforcer 1 comprises eight portions 15, eight portions 17 and nine connection lines 13, to form a reinforcer 1 with a greater length along the direction A1.

Each portion 15 and 17 forms a bridge, secured to the shrinkable layer 7 at its ends via lines 13. Each portion 15 and 17 and the shrinkable layer 7 delimit a conduit 19 passing through along the direction B1.

In the initial state of the shrinkable layer 7, as illustrated in FIG. 2, each portion 15 and 17 is folded down against the shrinkable layer 7, such that each conduit 19 has a flattened shape. In other words, little or no space is arranged between the layer 7 and the portion 15 or 17 in question, the corrugatable layers 9 and 11 extending practically flat along the shrinkable layer 7. Advantageously, each portion 15 and 17 is in contact over at least part of its length against the layer 7 in the initial state.

In the initial state, as illustrated in FIG. 2, the reinforcer 1 is substantially planar, or at least has a flattened shape, the thickness of which along a direction C1, defined perpendicular to the plane P7, is relatively small. In the initial state, the reinforcer 1 can thus easily be moved or transported, for example by being stacked with other similar reinforcers, or wound on a roll with an axis parallel to the direction B1, in particular if the reinforcer 1 has a significant length along the direction A1.

As illustrated in FIG. 3, in the shrunk state of the shrinkable layer 7, the portions 15 and 17 of the corrugatable layers 9 and 11 are forced to adopt a curved or domed shape, due to the tightening, along the direction A1, of the connection lines 13, under the action of the shrinkage of the layer 7. By going from the initial state to the shrunk state, the shrinkable layer 7 therefore causes the corrugatable layers 9 and 11 to go from a flattened state to a corrugated state. The concavity of the curvature of the portions 15 to 17 is then oriented toward the shrinkable layer 7. In other words, the portions 15 are curved along the direction C1 illustrated in FIG. 3, while the portions 17 are domed or curved in an opposite direction. By adopting this curved shape, the volume of the conduits 19 is increased relative to the configuration in which the shrinkable layer 7 is in the initial state. In practice, it is considered that the portions 15 and 17 are more curved in the configuration of FIG. 3 than in the configuration of FIG. 2, the curved nature of the portions 15 and 17 depending on the shrinkage rate of the shrinkable layer 7.

In order to form composite materials including the matrix 3, as described above, the reinforcer 1 is submerged in, filled with, or covered by, the matrix 3, while the shrinkable layer 7 is in the shrunk state, as illustrated in FIG. 4. The matrix 3 thus occupies the conduits 19, while at least partially, and preferably completely, surrounding the reinforcer 1. The conduits 19 occupied by the matrix 3 are completely occupied if the matrix 3 submerges the reinforcer 1, while the conduits 19 are left completely or partially free when the matrix 3 only covers the reinforcer 1.

To use said reinforcer 1, the reinforcer 1 is manufactured or provided such that the shrinkable layer 7 is in the initial state. The heat-shrink heat treatment is next carried out on said shrinkable layer 7, while the corrugatable layers 9 and 11 are already connected to the shrinkable layer 7 at the connection lines 13. The heat-shrink heat treatment then causes the shrinkable layer 7 to enter the shrunk state, which causes the shrinkable layers 9 and 11 to enter the corrugated state.

In a first case, the shrinkable layer 7 being in the shrunk state and the shrinkable layers 9 and 11 in the corrugated state, the reinforcer 1 is submerged in the matrix 3, while the latter is in a liquid state, to form the composite material. To that end, the reinforcer 1 is for example placed beforehand in a mold corresponding to the shape of the part 5, such that the hardenable material has, upon leaving the mold, a final or quasi-final shape, corresponding to that of the part 5.

Depending on the shape of the mold used, it is understood that the shape and dimensions of the composite part 5 to be manufactured may be adapted to the application. Depending on the shape of said part and how it will be used, the arrangement and distribution of one or several reinforcers 1 may be adapted. The arrangement in the distribution of the reinforcers 1 in particular depends on mechanical stresses to be applied to the composite material part. Each reinforcer 1 can be integrated by having a straight shape like in FIG. 4, or by being bent, by curvature of the shrinkable layer 7.

In a second case that is not illustrated, which can be done alternatively to or jointly with the first aforementioned case, a skin layer or sheet is attached, against the corrugatable layer 9 and/or a skin layer or sheet is attached against the corrugatable layer 11. Each skin layer is therefore connected to the corrugatable layer 9 or 11, extending parallel to the shrinkable layer 7. Each skin layer is connected to at least two portions 15 or 17 of the corrugatable layer 9 or 11 in question, for example by lamination.

For example, the skin layer is made from a nonwoven synthetic material, in particular polymer, for example a polyester, a polyester-cellulose hybrid, a polypropylene, polyethylene, or a polyamide.

Alternatively, the skin layer is made from a woven material.

Preferably, the heat-shrink heat treatment is done on or near the location where the reinforcer 1 is integrated into the composite material, i.e., submerged in, filled with, or covered by, the matrix 3 and/or provided with skin layers. The transport of the reinforcer 1 from its manufacturing location to said usage location is thus made easier.

Alternatively, in particular in the case where no heat-shrink heat treatment means is available on the formation location of the composite material, the heat-shrink heat treatment is done on or near the manufacturing location of the reinforcer 1. The reinforcer 1 is then transported from one location to the other while the shrinkable layer 7 is in the shrunk state.

Alternatively, the corrugatable portions 9 and 11 are of different natures. In this alternative, at least one of the two comprises a gridwork of yarns, the other preferentially on the contrary having no gridwork of yarns.

FIGS. 5 and 6 describe a reinforcer 100 according to the second embodiment of the invention. The reinforcer 100 of FIGS. 5 and 6 is similar to that of FIGS. 1 to 3, while having no corrugatable layer 11. Aside from this corrugatable layer 11, the reinforcer 100 comprises a shrinkable layer 7, a corrugatable layer 9, connection lines 13 and portions 15. The corrugatable layer 9 is connected to the shrinkable layer 7 at the connection lines 13, similarly on the reinforcer 1 and on the reinforcer 100.

In FIG. 5, the reinforcer 100 is shown with its shrinkable layer 7 in the initial state, while in FIG. 6, the shrinkable layer 7 is in the shrunk state. The portions 15 define conduits 19 with a variable volume depending on the state of the layer 7, which is comparable to the reinforcer 1 shown in FIG. 3. The use of the reinforcers 1 and 100 is therefore similar, with the exception that the reinforcer 100 only comprises one corrugatable layer 9.

The manufacturing machine 200 of FIG. 7 is configured to carry out a method for manufacturing the reinforcer 100 of FIGS. 5 and 6.

The machine 200 comprises a system of rollers 201 for supplying shrinkable layer 7, with a movement of said shrinkable layer 7 along the arrow 207, as well as a system of rollers for supplying corrugatable layer 9, not shown, with a movement of corrugatable layer 9 along the arrow 209. The layers 7 and 9 are provided separately on their system of respective supply rollers. An output roller 202 is also assembled on the machine 200, on which the reinforcer 100 manufactured by the machine 200 is wound.

The shrinkable layer 7 is stretched along the direction A1, between the system of rollers 201 and the output roller 202, which is rotated along the arrow 211. The corrugatable layer 9 is stretched between a stretching roller 213 and the output roller 202, while being placed in contact with the layer 7 by the stretching roller 213.

The machine 200 also comprises a device 215, which performs the bonding treatment 217 periodically on the layer 9 in order to secure it to the layer 7. The device 215 is arranged between the stretching roller 213 and the output roller 202, in order to define the connection lines 13 spaced apart along the direction A1. To that end, the device 215 is movable in an alternating movement parallel to a direction B1, which is parallel to the direction A1. The bonding treatment, which is for example a heat bonding treatment, is advantageously done through the layer 9.

Optionally, the machine 200 comprises a device 219, such as a furnace, that is able to apply a heat-shrink heat treatment 221 to the reinforcer 1, after the bonding treatment 217 has been done by the device 215. To that end, the device 219 is arranged between the device 215 and the output roller 202.

To obtain a reinforcer 1 with both a corrugatable layer 9 and a corrugatable layer 11 as illustrated in FIGS. 1 to 4, it is for example possible to repeat the method illustrated in FIG. 7, or to use a similar method.

The manufacture of the reinforcer 1 and the reinforcer 100 is thus particularly easy and inexpensive. This manufacture can easily be done on an industrial scale, directly downstream from the units for manufacturing the various layers 7, 9 and 11, or in a separate location.

Irrespective of the embodiment of the reinforcer described above, depending on whether this reinforcer 1 is implemented alone, submerged, filled or covered, it can be used for different applications:

- to form a light structure, to replace honeycomb structures, in particular in the aeronautics or automotive fields, in combination with one or several attached skin plates, for example by lamination, on the reinforcer,
- to form a casing or a built-up structure in the field of building or public works, by filling in the reinforcer with a material such as stones, sand, cement, concrete or the like, for example to replace an element of the Gabion type,
- to form a dam or flood barrier, with or without being filled by a filler material,
- to form a separating element or a partition, or at least to be included in the manufacture of such a separating element by giving it thermal insulation properties, or acoustic insulation and/or fire resistance properties,
- complex composite materials, to form objects with a special three-dimensional geometry, such as propeller blades, these objects for example being flat, not flat, and/or including one or several curve radii,
- to form a stiffener, using inherent strength properties in traction and/or flexion of the reinforcer, which may optionally be consolidated by submerging the reinforcer in the aforementioned consolidating matrix 3,
- to form a low-cost mechanical reinforcer, included in the production of a three-dimensional composite structure, obtained by submerging the reinforcer in a consolidating matrix as defined above,
- to form a flexible or resilient material, or at least having shock-absorbing properties, included in the production of ground coverings, seats, bumpers, hail protection materials, or
- to form ventilated elements, included for example in the production of ventilated tarps for automobiles, ventilated tarps for protecting and drying masonry, or in mattress production.

Many other applications are possible.

The features of each embodiment and alternative above can be used in the other embodiments and alternatives described above, as long as it is technically possible to do so.

The invention claimed is:

1. A reinforcer, comprising:
   a shrinkable layer, comprising shrinkable yarns causing the shrinkable layer to be able to shrink irreversibly in a direction of shrinkage, under the effect of a heat-shrink heat treatment, from an initial state to a shrunk state, by irreversible shrinkage of the shrinkable yarns from the initial state to the shrunk state under the effect of the heat-shrink heat treatment, the shrinkable yarns extending in the direction of shrinkage,
   a first corrugatable layer, which comprises a flat flexible grid work of yarns added against the shrinkable layer, the grid work of yarns of the first corrugatable layer comprising first yarns and second yarns, the first yarns extending along the direction of shrinkage, in alignment with the shrinkable yarns of the shrinkable layer, the second yarns extending transversally relative to the first yarns, the first yarns being assembled with the second yarns without weaving, in that the first yarns are connected to the second yarns by gluing or welding, wherein the grid work of yarns of the first corrugatable layer is connected to the shrinkable layer by connection lines spaced apart and extending transversely with respect to the direction of shrinkage and to the shrinkable yarns of the shrinkable layer, the first corrugatable layer exhibiting a shrinkage that is substantially zero or that is smaller than that of the shrinkable layer along the direction of shrinkage under the effect of the heat-shrink heat treatment, so that:
   when the shrinkable layer is in the initial state, portions of the first corrugatable layer, each defined between two consecutive connection lines, are folded down against the shrinkable layer, so that the corrugatable layer extends flat along the shrinkable layer, and
   when the shrinkable layer is in the shrunk state, the portions of the first corrugatable layer are curved.

2. The reinforcer according to claim 1, wherein the shrinkable yarns are made from a synthetic shrinkable polymer.

3. The reinforcer according to claim 2, wherein said synthetic shrinkable polymer is selected from the group consisting of: polyester, polyether, polyethylene, polypropylene, polyamide.

4. The reinforcer according to claim 2, wherein the synthetic shrinkable polymer is chosen so that the shrinkable layer is able to irreversibly shrink from the initial state to the shrunk state under the effect of the heat-shrink heat treatment, and
   wherein the heat-shrink heat treatment comprises heating to a shrinkage temperature of between 100 and 200° C.

5. The reinforcer according to claim 4, wherein the synthetic shrinkable polymer is chosen so that the heat-shrink heat treatment comprises heating to a shrinkage temperature of 180° C.

6. The reinforcer according to claim 1, wherein the shrinkable layer comprises transverse yarns that exhibit a shrinkage that is substantially zero or that is smaller than that of the shrinkable yarns under the effect of the heat-shrink heat treatment, and that are arranged transversely relative to the direction of shrinkage, while being connected to the shrinkable yarns without weaving, by gluing or welding of the transverse yarns with the skrinkable yarns, in order to form a gridwork with the shrinkable yarns.

7. The reinforcer according to claim 6, wherein the second yarns of the first corrugatable layer extend in alignment with the transverse yarns of the shrinkable layer.

8. The reinforcer according to claim 1, wherein the gridwork of the first corrugatable layer comprises inorganic yarns.

9. The reinforcer according to claim 8, wherein the inorganic yarns comprise glass, carbon, ceramic or metal.

10. The reinforcer according to claim 1, wherein the first corrugatable layer comprises a layer of nonwoven material, the gridwork of the first corrugatable layer being submerged in, or connected to, the layer of nonwoven material.

11. The reinforcer according to claim 10, wherein the layer of nonwoven material is made from polymer.

12. The reinforcer according to claim 11, wherein said polymer is selected from the group consisting of: polyester, polyester-cellulose hybrid, polypropylene, polyethylene, polyamide, polyurethane.

13. The reinforcer according to claim 1, wherein the first corrugatable layer is connected to the shrinkable layer by carrying out a bonding treatment, only at each connection line.

14. The reinforcer according to claim 13, wherein the bonding treatment is of a heat type.

15. The reinforcer according to claim 13, wherein the bonding treatment is of a chemical type.

16. The reinforcer according to claim 1, wherein the reinforcer comprises a second corrugatable layer, which comprises a gridwork of yarns attached against the shrinkable layer, such that the first corrugatable layer and the second corrugatable layer are attached on either side of the shrinkable layer, the gridwork of the second corrugatable layer being connected to the shrinkable layer by connection lines, the second corrugatable layer exhibiting a shrinkage that is substantially zero or that is smaller than that of the shrinkable layer, along the direction of shrinkage, under the effect of the heat-shrink heat treatment, so that:

when the shrinkable layer is in the initial state, portions of the second corrugatable layer, each defined between two consecutive connection lines, are folded down against the shrinkable layer, and when the shrinkable layer is in the shrunk state, the portions of the second corrugatable layer are curved.

17. The reinforcer according to claim 16, wherein the connection lines of the second corrugatable layer are superimposed on or combined with the connection lines of the first corrugatable layer.

18. The reinforcer according to claim 1, wherein the shrinkable yarns are made from natural shrinkable polymer.

19. The reinforcer according to claim 18, wherein the natural shrinkable polymer is wool.

20. A composite material comprising the reinforcer according to claim 1, the shrinkable layer of which is in the shrunk state, and comprising:

a matrix, the reinforcer being filled by, covered by, or submerged in the matrix, and/or a skin layer attached against the first corrugatable layer and connected to the first corrugatable layer via at least two curved portions.

21. A method for using a reinforcer, wherein the reinforcer is according to claim 1, the method comprising a first step a) during which, the shrinkable layer being in the initial state, a heat-shrink heat treatment is carried out to place the shrinkable layer in the shrunk state, as well as at least one of the following steps b) and c), carried out successively with respect to the first step a):

b) the reinforcer is submerged in, filled with or covered by a matrix, c) a skin layer is connected against the first corrugatable layer, by means of at least two curved portions.

22. The method of claim 21, wherein the skin layer is connected against the first corrugatable layer by lamination.

* * * * *